United States Patent
Lai et al.

(10) Patent No.: US 7,216,322 B2
(45) Date of Patent: May 8, 2007

(54) CLOCK TREE SYNTHESIS FOR LOW POWER CONSUMPTION AND LOW CLOCK SKEW

(75) Inventors: Ming-Hong Lai, Tao-Yuan (TW); Chao-Kai Chang, Tao-Yuan (TW); Chia-Chi Chu, Tao-Yuan (TW); Wu-Shiung Feng, Tao-Yuan (TW)

(73) Assignee: Chang Gung University, Tao-Yuan (TW)

( * ) Notice: Subject to any disclaimer, the term of this patent is extended or adjusted under 35 U.S.C. 154(b) by 219 days.

(21) Appl. No.: 10/935,670

(22) Filed: Sep. 7, 2004

(65) Prior Publication Data

US 2006/0053395 A1 Mar. 9, 2006

(51) Int. Cl.
*G06F 17/50* (2006.01)
(52) U.S. Cl. .................. 716/10; 716/5; 716/6
(58) Field of Classification Search .................. 716/10, 716/5, 6
See application file for complete search history.

(56) References Cited

OTHER PUBLICATIONS

Tsai, J.L., Chen, T.H. and Chen. C.C.P., "Short Papers—Zero Skew Clock-Tree Optimization with Buffer Insertion/Sizing and Wire Sizing", IEEE Transactions on Computer-Aided Design of Integrated Circuits and Systems, vol. 23, No. 4, Apr. 2004, pp. 565-572.
Mehta, A.D., Chen. Y.P., Menezes, N., Wong, D.F. and Pileggi, L.T., "Cluster and Load Balancing for Buffered Clock Tree Synthesis", Department of Computer Sciences, The University of Texas at Austin, © 1997, pp. 217-223.
Vittal, A. and Marek-Sadowska, M., "Low-Power Buffered Clock Tree Design", IEEE Transactios on Computer-Aided Design of Integrated Circuits and Systems, vol. 16, No. 9, Sep. 1997, pp. 965-975.
Oh, J. and Pedram, M., "Gated Clock Routing for Low-Power Microprocessor Design", IEEE Transactions on Computer-Aided Design of Integrated Circuits and Systems, vol. 20, No. 6, Jun. 2001, pp. 715-722.
Wang, Q. and Roy, S., "Power Minimization by Clock Root Gating", Cadence Design Systems, Inc., © 2003, pp. 249-254.
Neves, J.L. and Friedman, E.G., "Design Methodology for Synthesizing Clock Distribution Networks Exploiting Nonzero Localized Clock Skew", IEEE Transactions on Very Large Scale Integration (VLSI) Systems, vol. 4, No. 2, Jun. 1996, pp. 286-291.
Zeng, X., Zhou, D., and Li, W., "Buffer Insertion for Clock Delay and Skew Minimization", © 1999, pp. 1-6.

*Primary Examiner*—Sun James Lin
(74) *Attorney, Agent, or Firm*—Alan D. Kamrath; Nikolai & Mersereau, P.A.

(57) ABSTRACT

A method for low power clock tree synthesis using buffer insertion, removal and resizing for high-speed VLSI design is proposed. A developed tool can be embedded in the existing clock tree synthesis design flow to ensure satisfying both specifying database constrains and clock skew constrains. For a given clock tree netlist, location information of buffers, parameters of wires and buffers' timing and power library are all included. Buffer delay and wire delay of the given clock tree netlist are calculated first. Then, a feasible solution is solved if an input netlist is not feasible for given constrains. Finally, a modified low power clock tree netlist, which satisfies timing specifications, is obtained using the proposed method.

3 Claims, 6 Drawing Sheets

Design_Flow(Design, constraints, library
{
1. Check input transition and output load of each BUF and DFF;
2. if (DRC violation)
3. {
4.    Move all DFFs to the last leaf node of clock tree according to output loading;
5.    while( DRC violation)
6.      Balancing the output loading of BUFs;
7. }
8. Fast power reducing using buffer operation;
9. if (power consumption increasing or DRC violation)
10. Reset to last status;
11. Simulated annealing based optimization alogrithm;
12. return;
}

FIG.1

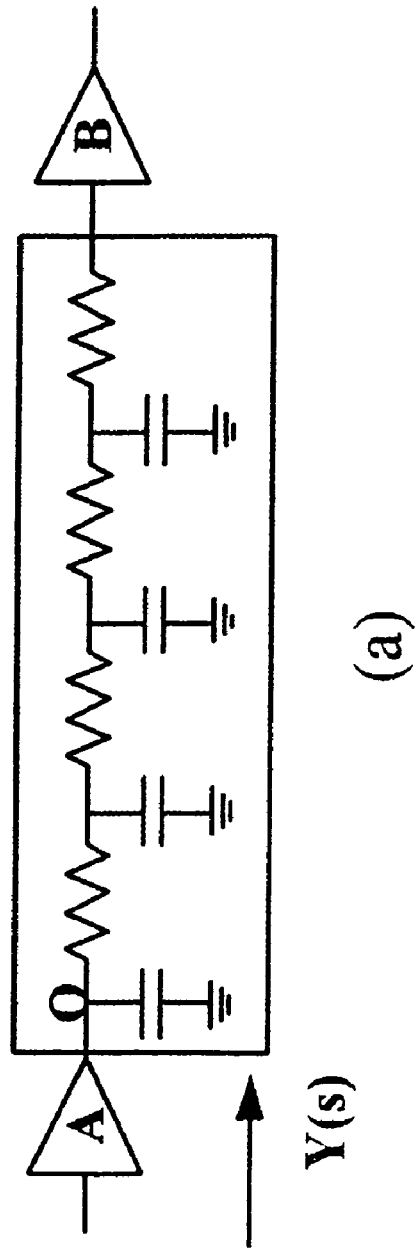
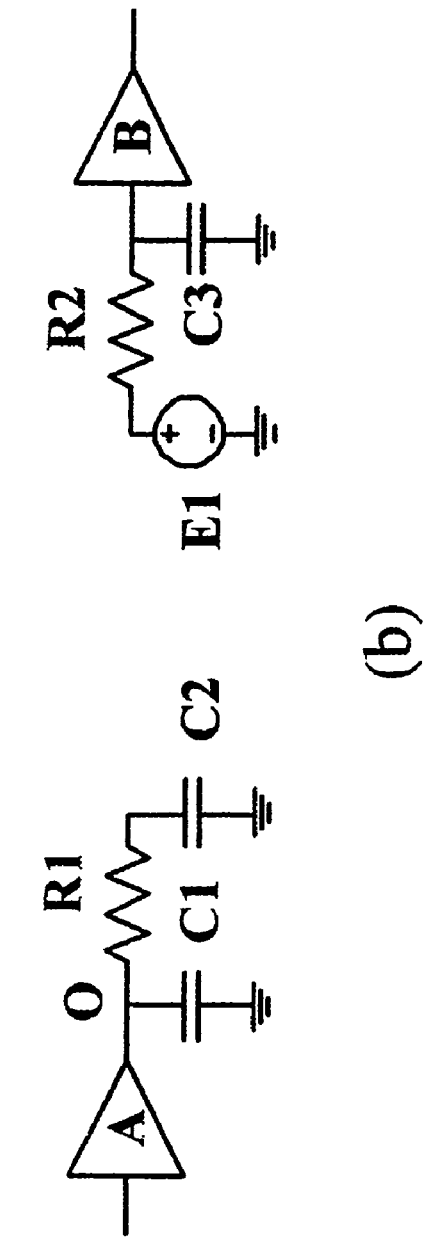
FIG.3

Optimization Algorithm(Design, constraints, library)
1. do
2.    {
3.       Calculate the power consumption old_power;
4.       Disturb the distribution of output DFFs loading;
5.       Check the clock skew and DRC violation;
6.       if (clock skew increase)
7.          reset to last status;
8.       Simulated annealing algorithm;
9.       if (power consumption increase)
10.      reset to last status;
11.      Calculate the power consumption opt_power;
12.    }
13. while (opt_power < old_power)
14. Reset to last status;
15. return;

FIG.4

Simulated Annealing( )
1. Design_prev <- initial design;
2. do {
3.    do {
4.       Design_opt <- disturb the distribution of DFFs;
5.       if (accept ( Design_prev, Design_opt )
6.          Design_prev <- Design_opt;
7.    }
8.    while ( !thermal_equilibrium );
9.    T = new T;
10. }
11. while (!stop);
12. return;

Accept (Design_prev, Design_opt )
1. Calculate the power consumption: cost(prev), cost(opt);
2. $\Delta c = \text{cost(prev)} - \text{cost(opt)}$;
3. if ( $\Delta c <= 0$)
4.    return 1;
5. else
6.    return ( $e^{-\Delta c/T}$ > random(1));

FIG.5

CLOCK TREE SYNTHESIS FOR LOW POWER CONSUMPTION AND LOW CLOCK SKEW

BACKGROUND OF THE INVENTION

1. Field of the Invention

The present invention relates to a clock tree synthesis and, more particularly, to a clock tree synthesis for low power consumption and low clock skew.

2. Description of Related Art

In the modem high speed VLSI design era, clock design plays a crucial role in determining chip performance and facilitating timing and design convergence. Clock routing is important in the layout design of a synchronous digital system as it influences correctness, area, speed and power dissipation of the synthesized system [reference 1 and 2]. Drastically increased requirements for high performance and high speed VLSI circuits have posed challenges to the design of high speed clock networks, where minimization of clock delay and clock skew has been a critical problem. So some circuit designers' inclination is toward developing techniques to minimize the power dissipation, the clock delay (latency) and the clock skew as well as developed, understood design and verification flows.

Buffer operations are widely used in designing clock distributed networks [reference 3]. Buffers can decouple capacitance to reduce equivalent loading of each wire, so rise time and wire delay could be reduced. Also, when the signal's transfer time is faster, it can reduce power consumption. Several methodologies are adopted in the power consumption and the clock skew minimization. The previous research inserts the buffers and constructs a H-tree to reach the optimization solution in both circuit area and the power consumption aspects [reference 4]. The balanced buffer insertion scheme attempts to partition the clock tree into several subtrees such that every subtree has equal path length and all source-to-sink paths have an equal number of levels. Clock gating is another well-known technique in reducing the dynamic power dissipation of a digital circuit [reference 5 and 6]. It saves power by shutting off the sequential elements and part of the clock network during an idle state.

The design of the clock distribution network also determines the clock skew. The clock skew directly affects chip performance in a close to one-to-one ratio, since it has to be counted as a cycletime penalty. The clock trees need to be incrementally adjusted accordingly with minimum changes to ensure an acceptable clock skew. The buffer insertion usually deals with the clock skew minimization problem [reference 7]. Other research using the buffer insertion method minimizes both the power consumption and the clock skew criterion [reference 4].

SUMMARY OF THE INVENTION

The main objective of the present invention is to provide an improved clock tree synthesis that reduces power consumption and clock skew.

To achieve the objective, the clock tree synthesis in accordance with the present invention can be embedded in existing clock tree synthesis design flow to ensure satisfying both specifying database constrains and the clock skew constrains. For a given clock tree netlist, the location information of buffers, the parameters of wires and the buffers' timing and power library are all included. Buffer delay and wire delay of the clock tree are calculated first. Then, a feasible solution is solved if a input netlist is not feasible for the given constrains. Finally, a modified low power clock tree netlist, which satisfies timing specifications, is obtained using the proposed method.

Further benefits and advantages of the present invention will become apparent after a careful reading of the detailed description with appropriate reference to the accompanying drawings.

BRIEF DESCRIPTION OF THE DRAWINGS

FIG. 1 is a pseudocode of a design flow of a clock tree synthesis in accordance with the present invention;

FIG. 3(a) is parastic model between two buffers of the present invention;

FIG. 3(b) is a reduced standard parasitic format model of the present invention;

FIG. 4 is a pseudocode of a simulated annealing based optimization algorithm of the present invention;

FIG. 5 is a pseudocode of the simulated annealing algorithm of the present invention.

DETAILED DESCRIPTION OF THE INVENTION

Figure 2:
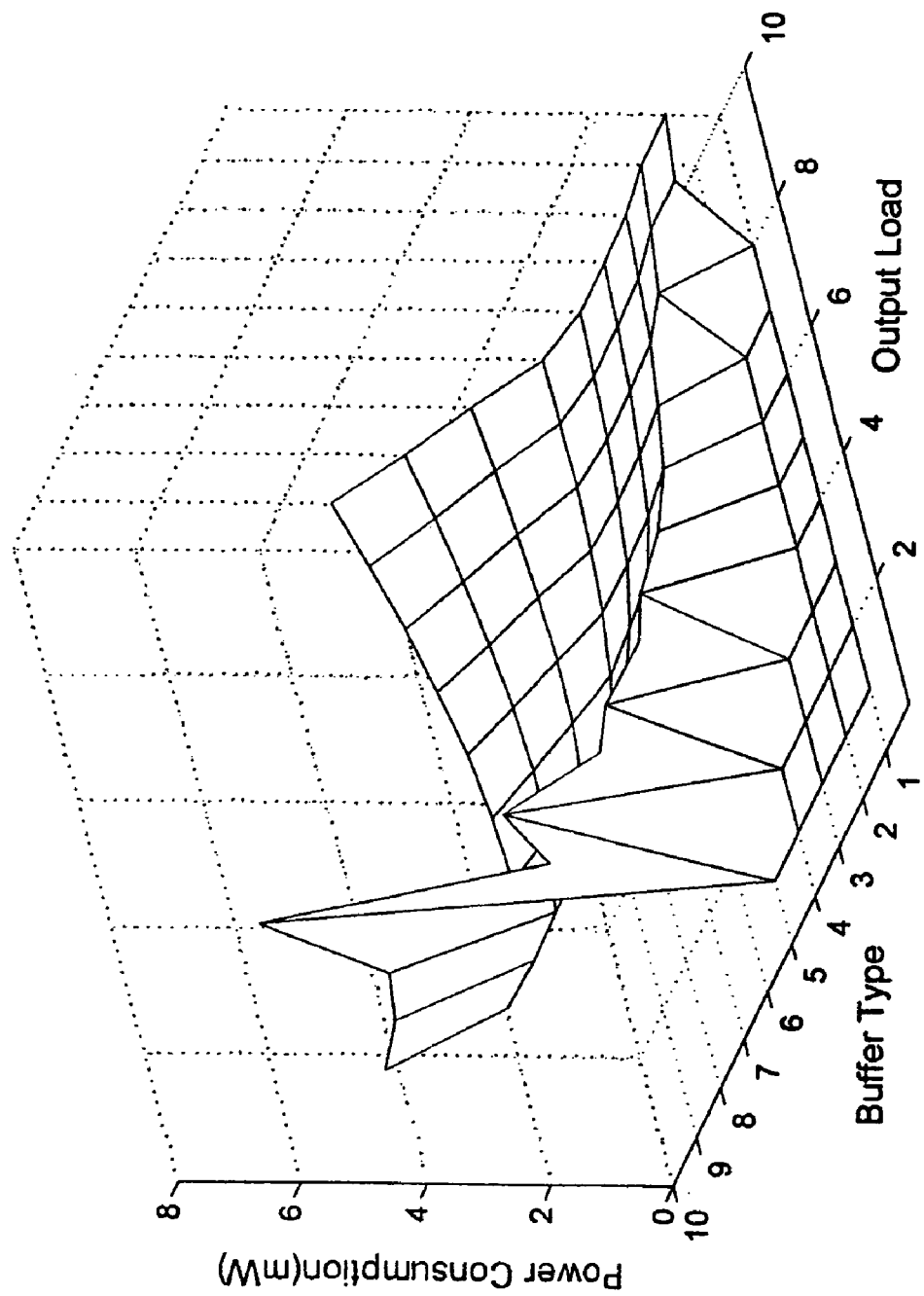
FIG. 2 is a diagram of power consumption for a three level clock tree design.

A clock distribution network that has been implemented with a cell placement and an initial clock tree is given. A specified liberty library that includes clock buffers and D-flip-flops (DFF) is also given. A clock network to dissipate minimal power and satisfy clock skew constraint at all receivers (DFFs) is also given. The clock skew should be small, even under process variations. A developed software has to apply allowable techniques, such as buffer insertion, buffer resizing, and buffer removal to reduce the dynamic power under the constraint of the maximum clock skew. It is allowed to resynthesize a better clock tree, except that a root (i.e. a clock input pad) of the clock tree should be the same as a root of the initial clock tree.

The power dissipated by the clock distribution network can be attributed to charging and discharging of wiring and load capacitances through interconnect resistance and driver resistance and to the static power dissipated, if any, by the buffers $$P = P_{static} + P_{dynamic} = \Sigma P_i + C_o \cdot L(T) \cdot f \cdot V^2 \qquad (1)$$

Here, $P_i$ is the static power dissipated by the ith clocked components. $C_o$ is capacitance per unit length and is set to 0.000076 in practical experience. $L(T)$ is wire length of the clock tree and can be simplified to a Manhattan distance, $$L(T) = |X_{cell1} - X_{cell2}| + |Y_{cell1} - Y_{cells}| \qquad (2)$$

where $X_{cell1}$ and $X_{cell2}$ are coordinates of $cell_i$. f and V are frequency of operation and voltage swing, respectively.

The clock network design determines buffer sizes, buffer locations, and buffer interconnect topology. It therefore affects the static power dissipation summation in the first term and the wire length in the second term. In Eq. (1), the static power of each gate is defined in a power model of the specified library. Both rise power and fall power have to be considered in a clock cycle. For CMOS VLSI, the static power consumed by the buffers is negligible, so that the problem has been reduced to minimizing the total capacitance, which is contributed by both wiring and buffers. In ECL (Emitter Coupled Logic), the static power dissipation has been dominated by the buffers. For multichip modules, both dynamic and static power consumption may be equally important.

Considering the clock skew constraint, the ith cell's clock latency can be represented as $t_{cd}^i$. For a zero clock skew clock tree designs, a clocked component $$\forall (i,j) \in T, \ s.t. \ t_{cd}^i = t_{cd}^j \quad (3)$$

In a digital synchronous circuit, the clock skew $T_{Skew}(i,j)$ between registers $R_i$ and $R_j$ is defined as the algebraic difference, $$T_{Skew}(i,j) = t_{cd}^i - t_{cd}^j \quad (4)$$

According to the characteristic of the clock network, the clock tree design considers only the clock latency from the clock root to the sink without thinking about the physical routing path.

In the clock distribution network design problem, the design rule check (DRC) problem is considered, including the input signal transition time and output loading constraints. The input transition time constraints can be defined as $$\forall_i \in T, \ s.t. \ T^i \leq T_k, \quad (5)$$

where $T_k$ is the specified maximum allowed input transition time of k-type cell, and $T^i$ is the transition time of the signal at the ith sink. Note that the constraint is extremely important as any recognizable clock must have a clock period of at least three times 10% to −90% rise time. The rise time of classically designed clock nets imposes a limit on the frequency of operation, even if logic delays are small.

In this section, a proposed clock tree synthesis tool for both low power consumption and low clock skew using buffer insertion, removal and resizing operations is proposed. Depending on a different technology library, the proposed method adopts various adjustments for the constraints. A pseudocode of the design flow is shown in FIG. 1. First, the proposed method loads three main input files, including (a) Design: the original clock tree design, (b) library: the technology depended buffer and DFF library, and (c) constraint: the constraint of the optimization target. Second, a program checks whether the original clock tree design meets the constraint or not. If there is a DRC violation condition, the program will modify it and conquer it. Third, a fast buffer resizing operation is executed to decrease the entire power consumption, but it takes risks to violate the design constraint. So the program checks the design again to avoid an unwanted condition in the next step. Finally, a simulated annealing (SA) algorithm based optimization method is told to reduce the power consumption and the clock skew of the clock tree. A detailed procedure is shown below.

In the procedure of low power consumption in the clock tree syntheses, the proposed method provides different methodology depending on the different technology library. In the specified buffer library, for instance, CLKBUFXL is the smallest size and CLKBUFX20 is the largest. For example, a simple three level clock tree contains 100 DFFs (D-flip-flops) in the leaves (i.e. clock signal receiving nodes of the DFFs) and buffer CLKBUFX8 in the root node. A diagram of the power consumption of the clock tree is shown in FIG. 2. The X axis means the number of the buffer in the second level of the clock tree. If there is only one buffer,
then, the buffer should connect to all of the 100 DFFs; if there are two buffers, then, each buffer should connect to 50 DFFs in average. The Y axis means the type of the buffer, the indexes from 1 to 9 means CLKBUFXL, CLKBUFX1, CLKBUFX2, CLKBIJFX3, CLKBUFX4, CLKBUFX8, CLKBUFX12, CLKBUFX16 and CLKBUFX20, respectively. Zero power consumption means that there is a DRC violation condition in the input transition time or the output loading constraints. According to the power distribution in FIG. 2, that CLKBUFX8 is the best choice in the fast buffer operation.

The timing constraint is depended on a propagation delay from the root buffer to the DFF leaf in the clock tree. It also means the summation of the buffer internal delay and interconnect delay on a entire path, such as $$t_{cd}^i = \sum_{j \in P(i)} BUF_j + \sum_{k \in P(i)} wire_k \quad (6)$$

where P(i) is the path from the root node to the ith buffer, $BUF_j$ means the internal delay of the jth buffer on the path P(i), and $wire_k$ is the kth interconnect on the path P(i). In order to calculate the propagation delay quickly, the parameter of the interconnects can be simplified as a reduced standard parasitic format (RSPF). In this model, the buffer resizing will not affect the interconnect delay. FIG. 3(a) shows the parasitic model between buffer A and buffer B, and transfer function is represented as Y(s). FIG. 3(b) is the parameter of RSPF model, where the π-model (R1, C1 and C2) is an approximation of the first three orders of Y(s). It also means the equivalent loading of buffer A, the value is C1+C2. A pin-to-pin interconnect delay can be simply shown in a RC model, and the value is R2+C3.

In order to simplify a computational cost, the wire loading as a direct proportion of the physical length has been chosen, and only considering a relationship between the delay of buffers and its loading, and neglecting the effects of the interconnect delay. In other words, the buffers or DFFs connected to the same driving buffer have the same input transition time and the same clock latency. The buffer's internal delay and output transition time uses a table look-up method from the specified library. If there is no exact value in the look-up table, an interpolation method is used instead. Generally speaking, the DFFs often connect in the leaf node: and the number of DFFs is more than ten times the number of buffers in the clock tree design.

In this subsection, a benefit of buffer operation for low power consumption and low clock skew constraints is described. In order to meet the low clock skew constraints in the clock tree, all of the DFFs to the leaves nodes is implemented according to the output loading of the connected buffer. The loading of the buffer will affect both its internal delay and its output clock transition time, which is also the input clock transition time of the next components. The large input clock transition time will cause both the large power consumption and large internal delay. So, the balanced output load of the buffers is the target to reduce both the power consumption and the clock latency.

In the fast feasible solution operation, the operation of buffer removal and resizing is applied. In the condition of improved performance, the buffers in a common path could be removed for reducing the power consumption. Next, according to the output loading of the leaves, a program changes the buffer size to the minimal requirement and calculates the total power consumption. Then, the proposed method changes all buffers to the same type to decrease the power rapidly. Finally, it chooses one suitable buffers set if it exists.

In this subsection, it can be guaranteed that there is no DRC violations in the clock distributed network design when entering this procedure. A pseudocode of optimization flow is shown in FIG. 4. A heuristic procedure first disturbs the distribution of a few DFFs. Then, the program checks whether the total power consumption increases or not. If a worse result appears, then, an algorithm will reset the distribution of DFFs to the previous status. In a simulated annealing algorithm procedure, shown in FIG. 5, a temperature coefficient T is introduced, and a cooling factor a $\alpha=0.9$ is used. The cost of changing is defined as $$\Delta c = \cos t(prev) - \cos t(opt),$$

an acceptable probability of changing is $$e^{\frac{-\Delta c}{T}},$$

and the new temperature T is defined as $\alpha$ T.

In order to reduce computational complexity, the DFFs in the same level of the clock tree are chosen to vary at the same time. It is reliable that the clock skew could be reduced simultaneously. After the simulated annealing procedure, the program checks the power consumption again. If there is improvement, then, the program will try to disturb the distribution of DFFs again and repeat the procedures above. On the other hand if there is no improvement, the program resets the clock tree structure to the previous status, and the program is terminated.

Figure 6:
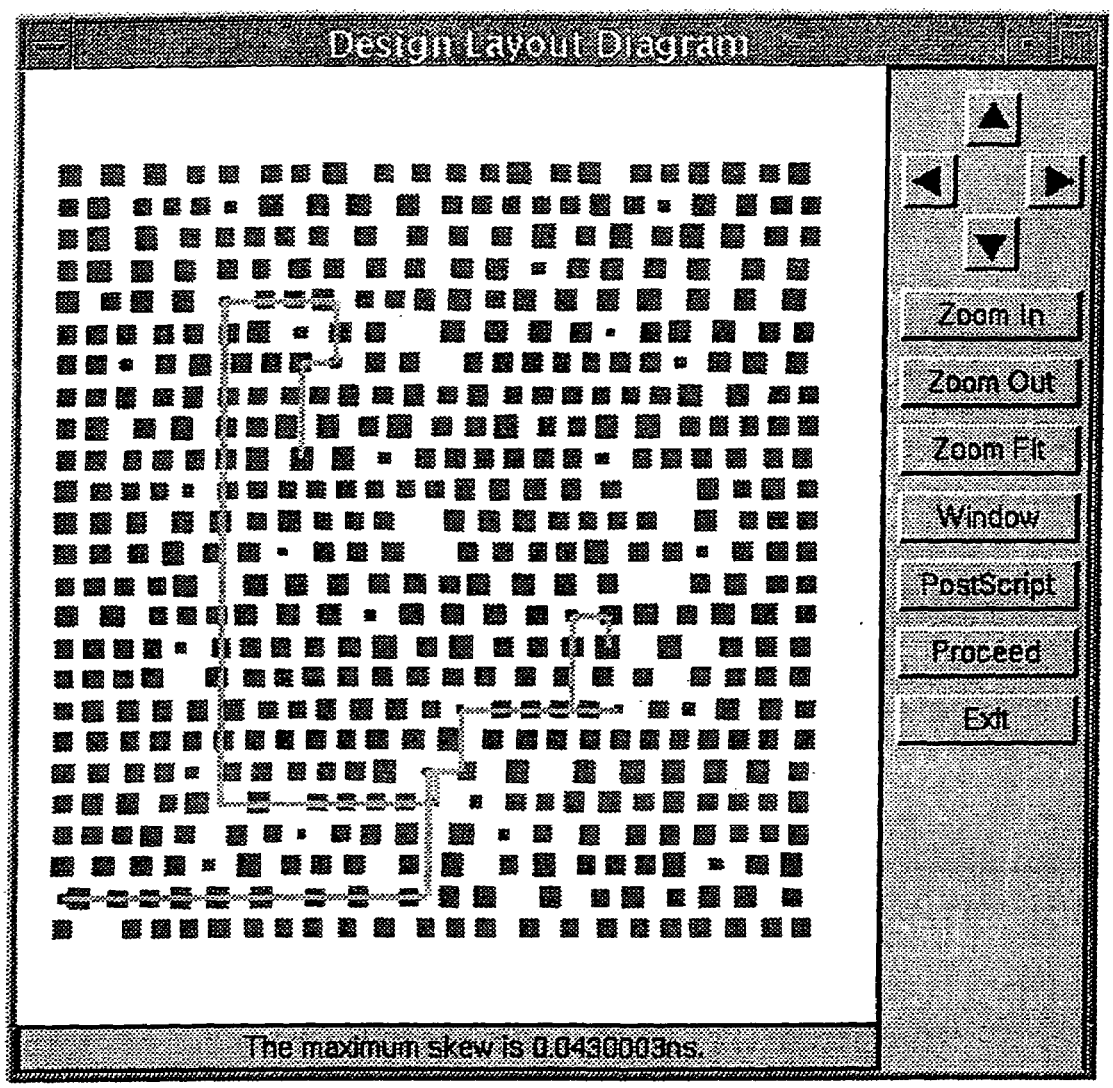
FIG. 6 is a design layout diagram result of an optimization operation of the clock tree of the present invention.

A proposed method in C on a SUN Blade 2000 with gcc 2.95 compiler is implemented. To illustrate accuracy and efficiency of the proposed method, five test cases of the clock tree design were provided for comparison studies. The information of each test case was shown in Table I, including the number of buffers, the number of DFFs, the power consumption, the maximum clock latency and the clock skew of the original clock tree design. After applying the proposed method, the information of maximum clock latency and power consumption of the specified test cases under different clock skew constraint was shown in Table II. A design layout diagram result of an optimization operation of the clock tree was shown in FIG. 6, the maximum and the minimum clock latency were highlighted on the figure. It was shown in Table II that the method could decrease the power consumption to 10% in average for a feasible solution, such as Exam. 1 in Table II. Furthermore, with intensifying the clock skew constraint, it could he observed that although the decreasing percentage is smaller, the power consumption of the optimization clock tree design is still smaller than the original one. It was also shown in Table II that the maximum clock latency increases in some cases. It was caused by the buffer inserting operation during the balanced clock tree structure. However, increasing of both maximum clock latency and the minimum clock latency does not matter to the operation of the clock tree.

A clock tree synthesis tool to perform buffer insertion, removal, resizing simultaneously for low power consumption and clock skew minimization in digital synchronous circuit design is embodied. Based on a traditional circuit design flow, the method considers different specified technology libraries to satisfy the design objective. Using the simulated annealing based optimization algorithm, the method can reduce more than 10% of the power consumption compared to the original design in average. Experimental results have demonstrated the accuracy and the efficiency of the proposed method.

Although the invention has been explained in relation to its preferred embodiment, it is to be understood that many other possible modifications and variations can be made without departing from the spirit and scope of the invention as hereinafter claimed.

TABLE I

COMPARISONS OF THE FIVE TEST CASES

|  | Case 1 | Case 2 | Case 3 | Case 4 | Case 5 |
| --- | --- | --- | --- | --- | --- |
| Number of Buffer | 30 | 113 | 251 | 238 | 262 |
| Number of DFF | 500 | 1234 | 5000 | 5000 | 500 |
| Power Consumption (mW) | 21.461 | 52.056 | 210.505 | 214.551 | 214.513 |
| Max. Clock Latency (ns) | 0.874 | 1.130 | 1.214 | 1.224 | 1.223 |
| Clock Skew (ns) | 0.014 | 0.020 | 0.055 | 0.064 | 0.060 |

TABLE II

OPTIMIZATION RESULTS ANALYSIS

|  |  | Case 1 | Case 2 | Case 3 | Case 4 | Case 5 |
| --- | --- | --- | --- | --- | --- | --- |
| Exam. 1 | Clock Skew Constraint (ns) | 0.08 | 0.1 | 0.5 | 0.5 | 0.5 |
|  | Max clock Latency Increase | +40% | +54% | +124% | +104% | +43% |
|  | Power Consumption (mW) | 18.014 | 44.323 | 189.736 | 197.257 | 193.030 |
|  | Power Reduced (%) | 16.06 | 14.86 | 9.87 | 8.06 | 10.01 |
| Exam. 2 | Clock Skew Constraint (ns) | 0.02 | 0.05 | 0.1 | 0.1 | 0.1 |
|  | Max clock Latency Increase | −12% | +14% | +33% | +48% | +11% |
|  | Power Consumption (mW) | 18.728 | 45.038 | 192.383 | 196.944 | 197.983 |
|  | Power Reduced (%) | 12.73 | 13.48 | 8.60 | 8.2 | 7.59 |
| Exam. 3 | Clock Skew Constraint (ns) | 0.01 | 0.02 | 0.05 | 0.08 | 0.07 |
|  | Max clock Latency Increase | +1% | +7% | +14% | +37% | +8% |
|  | Power Consumption (mW) | 19.858 | 51.434 | 195.837 | 204.858 | 207.403 |
|  | Power Reduced (%) | 7.47 | 1.19 | 6.96 | 4.51 | 3.31 |

TABLE II-continued

OPTIMIZATION RESULTS ANALYSIS

| | | Case 1 | Case 2 | Case 3 | Case 4 | Case 5 |
|---|---|---|---|---|---|---|
| Exam. 4 | Clock Skew Constraint(ns) | 0.005 | 0.015 | 0.03 | 0.06 | 0.05 |
| | Max clock Latency Increase | −6% | +4% | +4% | +46% | +7% |
| | Power Consumption(mW) | 21.394 | 51.723 | 204.903 | 200.482 | 209.710 |
| | Power Reduced(%) | 0.31 | 0.64 | 2.66 | 6.55 | 2.2 |

REFERENCES

[1] Ashok Vittal and M. Marek-Sadowska, "Low-Power Buffered Clock Tree Design," *IEEE Transaction on Computer-Aided Design of Intergrated Circuit and System*, Vol 16, No. 9, pp. 965–975, 1997.

[2] J. Oh and M. Pedram, "Gated Clock Routing for Low Power Microprocessor Design," *IEEE Trans. Computer-Aided Design*, vol. 20, pp. 715–222, 2001.

[3] Qi Wang and Sumit Roy, "Power Minimization by Clock Root Gating," 2003 *ASP-DAC*, pp. 249–254, 2003.

[4] J. L. Neves, E. G. Friedman, "Design Methodology for Synthesizimg Clock Distribution Networks Exploiting Nonzero Localize Clock Skew," *IEEE Transactions on VLSI System*, Vol.4, No.2, pp. 286–291, 1996.

[5] A. D. Mehta, Y. P. Chen, N. Denezes, D. F.Wang and L. T. Pileggi, "Clustering and Load Balancing for Buffered Clock Tree Synthesis," 1997 *IEEE International Conference on Computer Design*, pp. 217–223, 1997.

[6] X. Zeng, D. Zhou and W. Li, "Buffer Insertion for Clock Delay and Skew Minimization," in Proc. 1999 *Int. Symp. Physical Design*, pp. 36–41, 1999.

[7] J. L. Tsai, T. H. Chen and C. P. Chen, "Zero Skew Clock-Tree Optimization with Buffer Insertion/Sizing and Wire Sizing," *IEEE Trans. On Computer-Aided Design of Integrated Circuits and Systems*, Vol. 23, No. 4, pp. 565–572, 2004.

What is claimed is:

1. A method of clock tree synthesis for low power consumption and low clock skew, comprising:

inputting a clock tree synthesis netlist including electric parameter data of each path of a clock tree, timing of each buffer and a power database;

inputting timing standard maximum of clock skew;

determining characteristics of each buffer according to a design standard via a design standard validator that calculates a timing delay of an input signal inputting from a root of the clock tree to each buffer, transfer time of a flip-flop and output load of each buffer;

balancing clock tree load, and solving conditions of departing from a specific database design standard and clock tree skew greater than that of the specific database design standard;

changing buffer type based on the power database for quickly searching a feasible solution for reducing power consumption of the clock tree; and using heuristic of the specific database design standard and processes of optimum based on a simulating annealing method for searching an interconnect scheme of buffers on the clock tree to gain an optimization solution of the power consumption of the clock tree in all areas.

2. The method of clock tree synthesis as claimed in claim 1, wherein the determining characteristics of each buffer according to a design standard via a design standard validator comprises:

determining a transfer time of input signal of each buffer according to the characteristics of each buffer;

determining an output load of each buffer according to the characteristics of each buffer; and using the transfer time of the input signal of each buffer the output load of each buffer and an interpolation method to calculate clock delay and transfer time of output signal for each buffer.

3. The method of clock tree synthesis as claimed in claim 2, wherein the balancing clock tree load comprises:

connecting and re-connecting all flip-flops to a last layer of the clock tree-according to a load balance of the buffers for reducing influence of the clock skew on the clock tree; and balancing the output load of each buffer of the last layer of the clock tree for reducing the clock skew and minimizing total clock delay, which seriously influences total clock skew of the clock tree thereby effectively controlling a limit of the clock skew and improving signal transfer time for reducing power consumption of the clock tree.

* * * * *